US010060317B2

(12) United States Patent
Sannino et al.

(10) Patent No.: US 10,060,317 B2
(45) Date of Patent: Aug. 28, 2018

(54) METHOD OF OPERATING AN AFTERTREATMENT SYSTEM OF AN INTERNAL COMBUSTION ENGINE

(71) Applicant: GM GLOBAL TECHNOLOGY OPERATIONS LLC, Detroit, MI (US)

(72) Inventors: Salvatore Sannino, Grugliasco (IT); Gennaro Merlino, Turin (IT); Giancarlo Cifali, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 70 days.

(21) Appl. No.: 15/266,402

(22) Filed: Sep. 15, 2016

(65) Prior Publication Data

US 2017/0074137 A1 Mar. 16, 2017

(30) Foreign Application Priority Data

Sep. 15, 2015 (GB) .................................. 1516292.8

(51) Int. Cl.
| | |
|---|---|
| *F01N 3/08* | (2006.01) |
| *B01D 53/94* | (2006.01) |
| *F01N 9/00* | (2006.01) |
| *F01N 11/00* | (2006.01) |

(52) U.S. Cl.
CPC ....... *F01N 3/0885* (2013.01); *B01D 53/9477* (2013.01); *B01D 53/9495* (2013.01);
(Continued)

(58) Field of Classification Search
CPC ............ B01D 53/9477; B01D 53/9495; B01D 2251/2062; B01D 2258/012;
(Continued)

(56) References Cited

U.S. PATENT DOCUMENTS

| 7,062,904 B1* | 6/2006 | Hu ......................... F01N 3/035 60/274 |
| 2006/0010857 A1* | 1/2006 | Hu ..................... B01D 53/9481 60/286 |

(Continued)

FOREIGN PATENT DOCUMENTS

| GB | 2500928 A | * 10/2013 | ......... F02D 41/0275 |

OTHER PUBLICATIONS

Great Britain Patent Office, Great Britain Search Report for Great Britain Application No. 1516292.8, dated Nov. 6, 2015.

*Primary Examiner* — Laert Dounis
*Assistant Examiner* — Matthew T Largi
(74) *Attorney, Agent, or Firm* — Lorenz & Kopf, LLP (57) ABSTRACT

A method of operating an aftertreatment system of an internal combustion engine having a lean nitrogen-oxides trap and a reductant storage device placed downstream of the lean nitrogen-oxides trap is disclosed. A regeneration of the lean nitrogen-oxides trap is performed. During the regeneration, a reductant concentration between the lean nitrogen-oxides trap and the reductant storage device is measured. An amount of reductant produced by the nitrogen-oxides trap is calculated on the basis of the measured concentration. The amount of reductant produced may be used to stop regeneration of the LNT if this amount reaches the maximum available storage capacity, or to trigger a test of the proper functioning of the reductant storage device if there is at least a minimum amount of reductant available, or to switch to another operation mode of the reductant storage device and/or the LNT, in particular if this amount is larger than a threshold value.

15 Claims, 5 Drawing Sheets

(52) U.S. Cl.
CPC ......... *F01N 3/0814* (2013.01); *F01N 3/0842* (2013.01); *F01N 9/002* (2013.01); *F01N 11/007* (2013.01); *B01D 2251/2062* (2013.01); *B01D 2258/012* (2013.01); *F01N 2550/03* (2013.01); *F01N 2560/021* (2013.01); *F01N 2560/025* (2013.01); *F01N 2560/026* (2013.01); *F01N 2900/1402* (2013.01); *F01N 2900/1404* (2013.01)

(58) Field of Classification Search
CPC .... F01N 11/007; F01N 3/0814; F01N 3/0842; F01N 3/0885; F01N 9/002; F01N 2550/03; F01N 2560/021; F01N 2560/025; F01N 2560/026; F01N 2900/1402; F01N 2900/1404
See application file for complete search history.

(56) References Cited

U.S. PATENT DOCUMENTS

| | | | |
|---|---|---|---|
| 2009/0025367 A1* | 1/2009 | McCarthy, Jr. | B01D 53/9409 60/274 |
| 2010/0024394 A1* | 2/2010 | Kitazawa | B01D 53/9495 60/276 |
| 2011/0113753 A1* | 5/2011 | Christner | B01D 53/9409 60/274 |
| 2011/0131949 A1* | 6/2011 | Adams | F01N 3/0842 60/274 |
| 2013/0025261 A1* | 1/2013 | Sun | F02D 41/146 60/274 |
| 2015/0174529 A1 | 6/2015 | Irisawa | |

* cited by examiner

METHOD OF OPERATING AN AFTERTREATMENT SYSTEM OF AN INTERNAL COMBUSTION ENGINE

CROSS-REFERENCE TO RELATED APPLICATION

This application claims priority to Great Britain Patent Application No. 1516292.8, filed Sep. 15, 2015, which is incorporated herein by reference in its entirety.

TECHNICAL FIELD

The present disclosure pertains to a method of operating an aftertreatment system of an internal combustion engine, in particular an aftertreatment system provided with a lean nitrogen-oxides trap (LNT) upstream of a reductant storage device, such as a selective catalytic reduction system (SCR) or a selective catalytic reduction system on particulate filter (SCRF).

BACKGROUND

It is known that exhaust gas aftertreatment systems of internal combustion engines may be equipped, among other aftertreatment devices, with a lean nitrogen-oxides trap (LNT) which is provided for trapping nitrogen oxides (NOx) contained in the exhaust gas.

These aftertreatment devices are subjected to periodical regeneration events in order to release the NOx from the Lean NOx traps. A regeneration event may be operated by switching the engine from a conventional lean-combustion mode to a rich-combustion mode. When the engine is switched to the rich-combustion mode, the NOx stored on adsorbent sites of the LNT reacts with reductants contained in the exhaust gas, such as unburned Hydrocarbons (HC), and are desorbed and converted to nitrogen ($N_2$) and ammonia ($NH_3$).

In some aftertreatment system configurations, the LNT may be followed by a passive (or in-situ) $NH_3$ storage device, such as a selective catalytic reduction system (SCR) or a selective catalytic reduction system on particulate filter (SCRF), which stores and then uses the ammonia generated by the LNT during the regeneration events as a reductant for reducing NOx contained in the exhaust gas downstream of the LNT, without requiring external $NH_3$ sources.

Since the amount of ammonia generated by the LNT depends on many parameters, a need exists of a method that provides a proper and accurate determination of the amount of $NH_3$ which is produced by the LNT during the regeneration event and which may accumulate into the $NH_3$ storage device during the regeneration event of the LNT.

SUMMARY

The present disclosure provides a solution to the foregoing need with a simple, rational and rather inexpensive solution. An embodiment of the disclosure provides a method of operating an aftertreatment system of an internal combustion engine having a lean nitrogen-oxides trap and a reductant storage device placed downstream of the lean nitrogen-oxides trap. A regeneration of the lean nitrogen-oxides trap is performed. During the regeneration, a reductant concentration in an exhaust gas is measured between the lean nitrogen-oxides trap and the reductant storage device. An amount of reductant produced by the nitrogen-oxides trap is calculated on the basis of the measured concentration.

As a result, a determination of the amount of reductant produced by the lean nitrogen-oxides trap during the regeneration of the NOx trap requires less calibration effort and less computation power compared to other known methods based on open loop control models.

The amount of reductant produced by the nitrogen-oxides trap as determined above may be used to stop the regeneration of the LNT if this amount reaches the maximum available storage capacity. In other words, the operation mode of the LNT is changed from a rich combustion mode to a lean combustion mode if the obtained amount of reductant produced by the nitrogen-oxides trap is larger than a first threshold value. This amount of reductant may also be used to trigger a test of the proper functioning of the reductant storage device if there is at least a minimum amount of reductant available. In other words, the operation mode of the reductant storage device is changed from a mode where NOx is reduced (i.e., a NOx reduction mode) to a diagnosis mode where its proper functioning is tested. This change of operation mode occurs if the determined amount of reductant produced by the nitrogen-oxides trap is larger than a second threshold value. The first and second threshold values are typically different (although this is not a requirement), as the first threshold value is typically larger than the second threshold value. Thus, the amount of reductant produced by the nitrogen-oxides trap may be used to switch to another operation mode of the reductant storage device and/or the LNT, in particular if this amount is larger than a threshold value.

According to an embodiment, the reductant concentration may be measured with a NOx sensor having a cross sensitivity for the reductant (e.g. ammonia). In this way, since the aforesaid NOx sensor is often present between the lean nitrogen-oxides trap and upstream of the reductant storage device for other control tasks, the measurement of the reductant concentration may be achieved without additional dedicated sensors.

According to an embodiment of the present disclosure, the reductant concentration may be measured if a predetermined enabling condition is fulfilled. This aspect of the solution may reduce the probability of false identifications, thereby improving the reliability of the measurement of the reductant concentration. In this regard, according to an example of such embodiment, the method may estimate a nitrogen oxides concentration downstream of the lean nitrogen-oxides trap in the exhaust gas during the regeneration, and identify that the enabling condition is fulfilled, when the estimated nitrogen oxides concentration is smaller than a predetermined threshold value. When this condition is fulfilled the measurement performed by the NOx sensor is representative of the reductant concentration.

According to an aspect of the present disclosure, the calculation of the amount of reductant produced by the lean nitrogen-oxides trap may include estimating a first quantity of the reductant on the basis of one or more parameters and calculating the amount of reductant produced by the lean nitrogen-oxides trap as a function of the estimated first quantity and a second amount of reductant calculated as a function of the measured reductant concentration. The one or more parameters may be selected from the group consisting of a temperature value of an exhaust gas during the regeneration, a value of a nitrogen oxides concentration upstream of the lean nitrogen oxides trap, a value of a nitrogen-oxides content stored in the lean nitrogen oxides trap and a set point value of an air/fuel ratio during the regeneration. In this way, the determination of the amount of reductant produced by the lean nitrogen-oxides trap can be achieved in a rational and simple way, thereby minimizing the disturbances on the NOx sensor sensitivity.

In particular, the estimated first quantity may be obtained by an open loop control model, which is pre-calibrated (for example on a test bench), and then corrected using the second quantity of reductant which is calculated taking into account the feedback signal coming from the NOx sensor.

According to a further embodiment, the amount of reductant produced by the lean nitrogen-oxides trap may be calculated with the following formula:

$$[NH_3]_{tot} = (1-k)*A + k*B$$

Wherein:
$[NH_3]_{tot}$ is the amount of reductant produced by the lean nitrogen-oxides trap,
A is the estimated first quantity, B is the calculated second quantity, and
k is a correction factor.

The correction factor k may be determined on the basis of one or more parameters selected from the group consisting of a temperature value of the exhaust gas during the regeneration, a value of an oxygen concentration of the exhaust gas during the regeneration and an ageing factor of a sensor sensing a concentration of the reductant downstream of the lean nitrogen-oxides trap and upstream of the reductant storage device. As a result, the determined amount of reductant produced by the lean nitrogen-oxides trap may be corrected taking account of the temperature of the exhaust gas during the regeneration, the oxygen concentration of the exhaust gas during the regeneration and the ageing factor of the NOx sensor, parameters which influence the reductant sensitivity of the NOx sensor, in such a way to minimize possible disturbances on the sensor sensitivity.

According to another aspect of the present disclosure, the method may further include interrupting the regeneration, when the calculated amount of reductant produced by the lean nitrogen-oxides trap is equal to or greater than a maximum storage capacity or is equal to a maximum storage capacity minus an offset. In the latter case the offset may be chosen to be 5% or 10% of the maximum storage capacity. As a result, a reduction of fuel consumption during a rich mode operation of the internal combustion engine (i.e. during a regeneration event of the lean NOx trap) may be achieved and, at the same time, a reductant slip downstream of the reductant storage device may be avoided.

As an alternative, an aspect of the present disclosure may be that the method may include testing the proper functioning of the reductant storage device, if the calculated amount of reductant produced by the lean nitrogen-oxides trap is equal to or greater than a predetermined threshold value thereof. In this way, the amount of reductant produced by the lean nitrogen-oxides trap, which may be assumed to be slipped in the reductant storage device, may be used as a starting step or an enabling condition for a test strategy which may allow to diagnose the proper functioning of the reductant storage device in its function of NOx reducer. In particular a test strategy may be performed only if a minimum amount of reductant, produced in the lean NOx trap during a regeneration event, is certainly stored into the reductant storage device.

According to a further aspect of such embodiment, by way of an example, the testing may include determining a first value of nitrogen oxides concentration upstream of the reductant storage device, determining a second value of nitrogen oxides concentration downstream of the reductant storage device, calculating a difference between the first value and the second value; and identifying a malfunctioning of the reductant storage device, if the calculated difference is equal to or smaller than a predetermined threshold value thereof. In this way the driver may be informed of the malfunctioning of the reductant storage device and that a service intervention is needed.

The proposed solution, achieving basically the same effects of the method described above, may be carried out with the help of a computer program including a program-code for carrying out, when run on a computer, the steps of the method described above, and in the form of a computer program product including the computer program. The method can be also embodied as an electromagnetic signal, said signal being modulated to carry a sequence of data bits which represent a computer program to carry out all steps of the method.

Another embodiment of the solution, achieving basically the same effects of the method described above, provides an aftertreatment system including a lean nitrogen-oxides trap, a reductant storage device placed downstream of the lean nitrogen-oxides trap, a sensor sensing a concentration of the reductant downstream of the lean nitrogen-oxides trap and upstream of the reductant storage device, and an electronic control unit configured to carry out the method as disclosed above.

According to another aspect of such embodiment, the sensor may be a nitrogen oxides sensor having a cross sensitivity to the reductant. In this way, being the nitrogen-oxides sensor having a cross-sensitivity to the reductant (i.e. ammonia) often used for sensing nitrogen-oxides downstream of the lean nitrogen-oxides trap and upstream of the reductant storage device for other diagnostic and control systems of the internal combustion engine operation mode, the measurement of the reductant concentration may be achieved without increasing the aftertreatment system layout costs.

According to a further aspect of such embodiment, the reductant storage device may be a passive reductant storage device using reductants generated by the lean nitrogen-oxides trap during regeneration thereof for reducing nitrogen-oxides leaving the lean nitrogen-oxides. As a result, the aftertreatment system does not require external $NH_3$ sources, such as urea sources.

Another embodiment of the solution, provides an internal combustion engine equipped with an aftertreatment system as above disclosed.

Another embodiment of the solution provides an apparatus for operating an aftertreatment system of an internal combustion engine, wherein the aftertreatment system includes a lean nitrogen-oxides trap, and a reductant storage device placed downstream of the lean nitrogen-oxides trap, the apparatus including: an electronic control unit or other means for performing a regeneration of the lean nitrogen-oxides trap; a sensor, electronic control unit or other means for measuring, during the regeneration, a reductant concentration in an exhaust gas between the lean nitrogen-oxides trap and the reductant storage device; and a control unit or means for calculating an amount of reductant produced by the nitrogen-oxides trap on the basis of the measured concentration. This embodiment achieves basically the same effects of the method described above, particularly that of providing a simple and reliable solution for determining the amount of reductant produced by the lean nitrogen-oxides trap during the regeneration of the NOx trap. Moreover, a more precise and accurate determination of the amount of reductant produced by the lean nitrogen-oxides trap during the regeneration of the NOx trap is achieved using a feedback signal coming from the sensor.

According to an embodiment, the sensor for measuring the reductant concentration may include a NOx sensor having a cross sensitivity for the reductant. In this way, the measurement of the reductant concentration may be achieved without increasing the aftertreatment system layout costs.

According to an embodiment of the present disclosure, the electronic control unit or other means for measuring the reductant concentration may be configured to perform said measurement if a predetermined enabling condition is fulfilled. This aspect of the solution may reduce the probability of false identifications, thereby improving the reliability of the measurement of the reductant concentration.

In this regard, the electronic control unit or other means may be configured to estimate a nitrogen oxides concentration downstream of the lean nitrogen-oxides trap during the regeneration and identify that the enabling condition is fulfilled, when the estimated nitrogen oxides concentration is smaller than a predetermined threshold value thereof. When this condition is fulfilled the measurements performed by the NOx sensor are representative of the reductant concentration.

According to an aspect of the present disclosure, the electronic control unit or other means for calculating the amount of reductant produced by the lean nitrogen-oxides trap may be configured to estimate a first quantity of the reductant on the basis of one or more parameters and calculate the amount of reductant produced by the lean nitrogen-oxides trap as a function of the estimated first quantity and a second quantity of the reductant calculated as a function of the measured reductant concentration. The one or more parameters may be selected from the group consisting of a temperature value of an exhaust gas during the regeneration, a value of a nitrogen-oxides concentration upstream of the lean nitrogen oxides trap, a value of a nitrogen-oxides content stored in the lean nitrogen oxides trap and a set point value of an air/fuel ratio during the regeneration. In this way, the determination of the amount of produced by the lean nitrogen-oxides trap can be achieved in a rational and simple way, thereby minimizing the disturbances on the NOx sensor sensitivity.

In particular, the estimated first quantity may be estimated using an open loop control model, which is pre-calibrated (for example on a test bench) and then corrected using the second quantity which is calculated taking into account the feedback signal coming from the NOx sensor. In the simplest way the second quantity can be equal to the amount of reductant as obtained by the NOx sensor value.

According to a further embodiment, the electronic control unit or other means may be configured to calculate the amount of reductant produced by the lean nitrogen-oxides trap with the following formula:

$[NH_3]_{tot}=(1-k)*A+k*B$,

Wherein:

$[NH_3]_{tot}$ is the amount of reductant produced by the lean nitrogen-oxides trap, A is the estimated first quantity, B is the calculated second quantity, and k is a correction factor.

The correction factor k may be determined on the basis of one or more parameters selected from the group consisting of a temperature value of the exhaust gas during the regeneration, a value of an oxygen concentration of the exhaust gas during the regeneration and an ageing factor of a sensor sensing a concentration of the reductant downstream of the lean nitrogen-oxides trap and upstream of the reductant storage device. As a result, the determined amount of reductant produced by the lean nitrogen-oxides trap may be corrected taking account of the temperature of the exhaust gas during the regeneration, the oxygen concentration of the exhaust gas during the regeneration and the ageing factor of the NOx sensor, parameters which influence the reductant sensitivity of the NOx sensor, in such a way to minimize possible disturbances on the sensor sensitivity.

According to another aspect of the present disclosure, the apparatus may include an electronic control unit or other means for interrupting the regeneration when the calculated amount of reductant produced by the lean nitrogen-oxides trap gets equal to or greater than a maximum storage capacity. As a result, a reduction of fuel consumption during a rich mode operation of the internal combustion engine (i.e. during a regeneration event of the lean NOx trap) may be achieved and, at the same time, a reductant slip downstream of the reductant storage device may be avoided.

As an alternative, the apparatus may include an electronic control unit or other means for testing the proper functioning of the reductant storage device, if the calculated amount of reductant produced by the lean nitrogen-oxides trap gets equal to or greater than a predetermined threshold value thereof. In this way, the calculated amount of reductant produced by the lean nitrogen-oxides trap, which can be assumed to be slipped in the reductant storage device, may be used as a starting step or an enabling condition for a test strategy which may allow to diagnose the proper functioning of the reductant storage device in its function of NOx reducer. In particular, a test strategy may be performed only if a minimum amount of reductant, produced in the lean NOx trap during a regeneration event, is certainly stored into the reductant storage device.

According to a further aspect of such embodiment, by way of an example, the electronic control unit or testing means may be configured to determine a first value of nitrogen oxides concentration upstream of the reductant storage device, determine a second value of nitrogen oxides concentration downstream of the reductant storage device, calculate a difference between the first value and the second value; and identify a malfunction of the reductant storage device, if the calculated difference is equal to or smaller than a predetermined threshold value thereof. In this way the driver may be informed of the malfunctioning of the reductant storage device and that a service intervention is needed.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
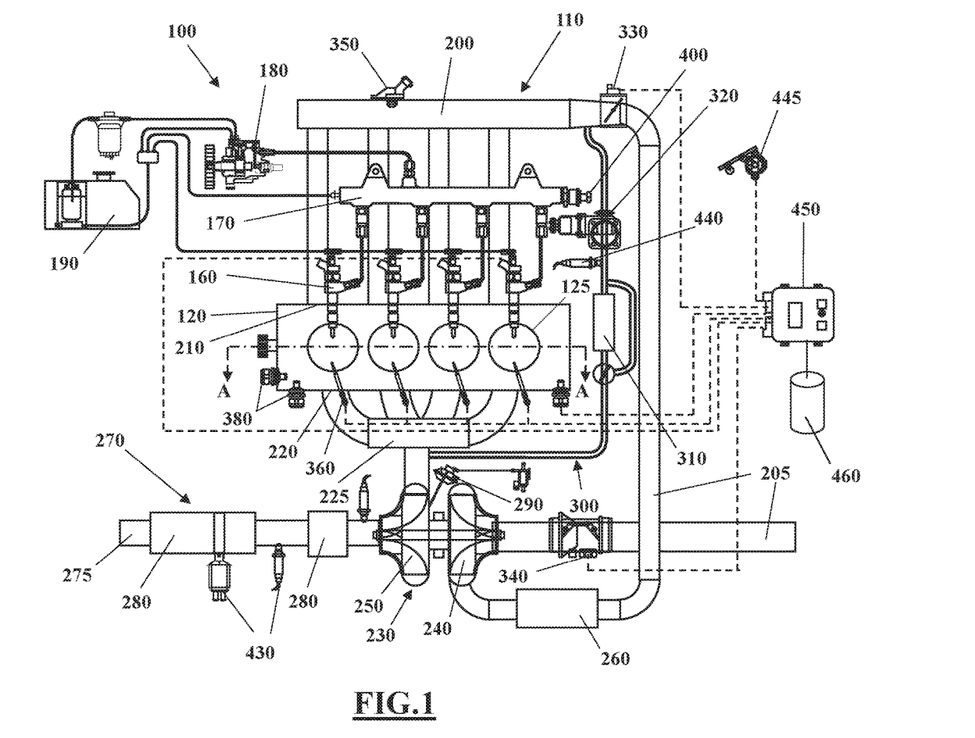
FIG. 1 shows an automotive system.
Figure 2:
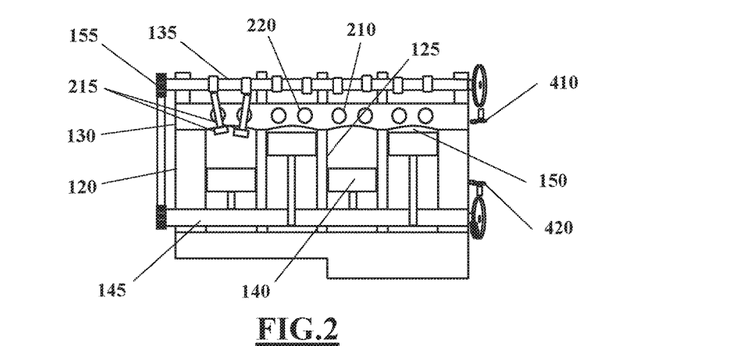
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having a cylinder block 120 defining at least one cylinder 125 having a piston 140 coupled to rotate a crankshaft 145. A cylinder head 130 cooperates with the piston 140 to define a combustion chamber 150.

A fuel and air mixture (not shown) is injected in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190.

Each of the cylinders 125 has at least two valves 215, actuated by a camshaft 135 rotating in time with the crankshaft 145. The valves 215 selectively allow air into the combustion chamber 150 from the intake port 210 and alternately allow exhaust gases to exit through an exhaust port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle valve 330 may be provided to regulate the flow of air into the intake manifold 200. In still other embodiments, a forced air system such as a turbocharger 230, having a compressor 240 rotationally coupled to a turbine 250, may be provided. Rotation of the compressor 240 increases the pressure and temperature of the air in the air intake duct 205 and intake manifold 200. An intercooler 260 disposed in the air intake duct 205 may reduce the temperature of the air.

The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust gas aftertreatment system 270. This example shows a variable geometry turbine (VGT) 250 with a VGT actuator 255 arranged to move the vanes to alter the flow of the exhaust gases through the turbine 250.

Figures 3, 7:
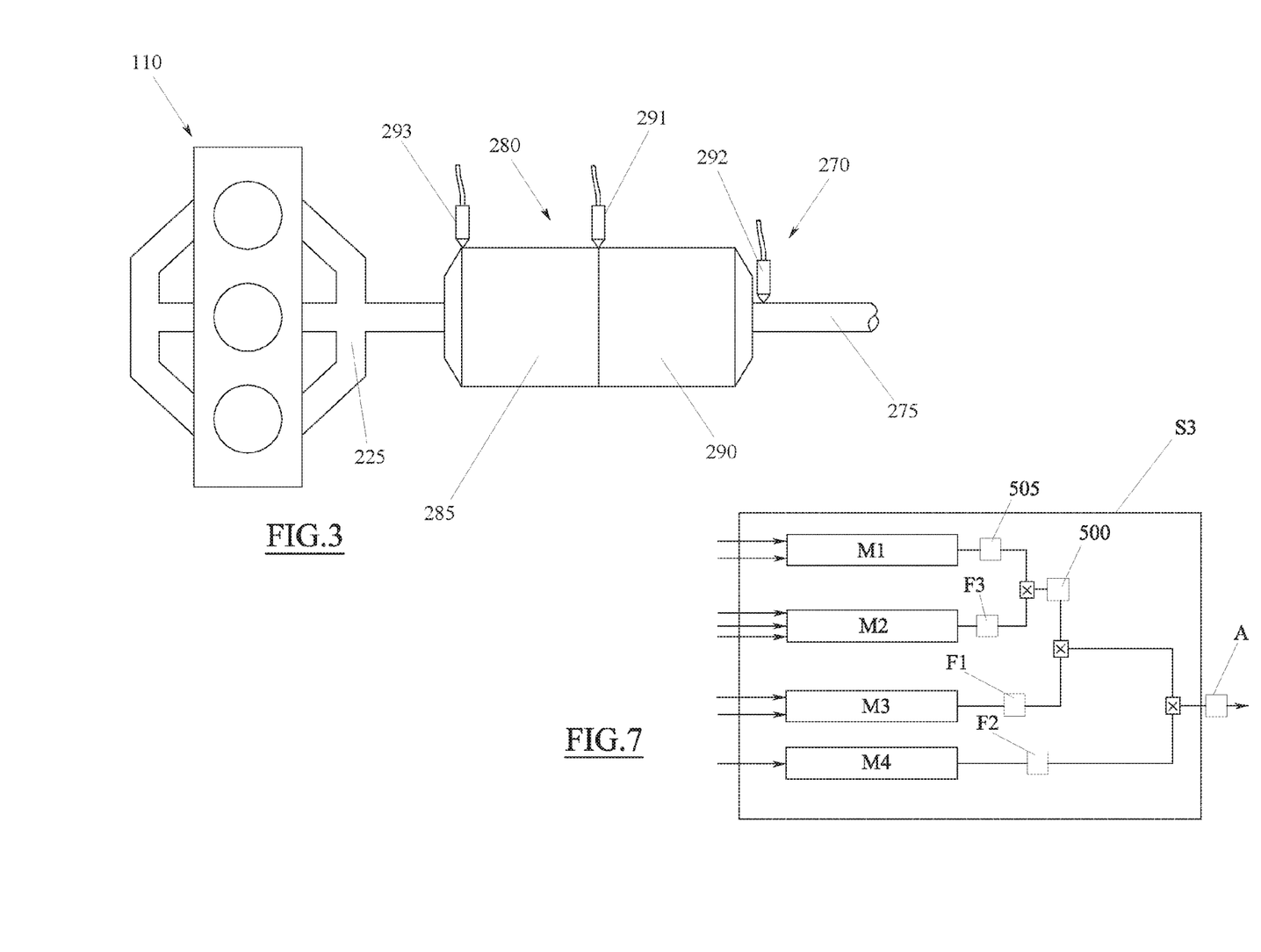
FIG. 3 is a schematic view of an exhaust gas aftertreatment system according to an embodiment of the present solution.
FIG. 7 is a flowchart of a method of estimating a first quantity of reductant produced in the aftertreatment system of FIG. 3, according to an embodiment of the present disclosure.

The exhaust gas aftertreatment system 270 may include an exhaust gas line 275 having one or more exhaust aftertreatment devices 280. The aftertreatment devices 280 may be any device configured to change the composition of the exhaust gases. Some examples of aftertreatment devices 280 include, but are not limited to, catalytic converters (two and three way), oxidation catalysts, for example a Diesel Oxidation Catalyst (DOC), a lean NOx trap (LNT) 285, hydrocarbon adsorbers, a reductant storage device 290, such as a selective catalytic reduction (SCR) systems or a Selective Catalytic Reduction washcoated particulate filter (SDPF or SCR on DPF) located in the exhaust line 275 downstream of the LNT 285, and particulate filters, in particular a Diesel Particulate Filter (DPF). In particular, the LNT 285 and the reductant storage device 290 may be positioned in all possible close-coupled or under floor configurations. Preferably, the LNT 285 could be positioned as close as possible to the exit of the turbocharger 230 to take advantage of the high temperature conditions which are beneficial for both LNT 285 and reductant storage device 290.

The LNT reduces engine-out exhaust gas constituents (CO and HC) with high efficiency and stores NOx during lean operating conditions of the ICE 110, i.e. conditions wherein an excess of air in the fuel and air mixture is disposed in the combustion chamber 150. During a regeneration event ($DeNO_x$ event) of the LNT 285, the ICE 110 may be switched to operate under rich operating conditions, i.e. conditions wherein an excess of fuel in the fuel and air mixture is disposed in the combustion chamber 150, and NOx are released by the LNT 285 and converted. In particular, during this rich operating conditions, ammonia ($NH_3$) is also generated. A quantity of the generated ammonia depends on the specific management of the rich combustion conditions, as for example the lambda value, the duration of each single regeneration events and the temperature conditions. Experimental activities on LNT 285 indicate, for example, the following relationships:

the higher the duration of the single event, the higher the $NH_3$ generation;

the lower the lambda value (the higher the HCs & $H_2$ amount), the higher the $NH_3$ generation;

the higher the temperature in front of LNT 285, the higher the $NH_3$ generation; and the higher the NOx amount at the engine-out the higher the $NH_3$ generation.

The ammonia ($NH_3$) generated by the LNT 285 is released by the LNT 285 and slips therethrough toward the reductant storage device 290 where it is stored. The ammonia stored over the reductant storage device 290 contributes to an additional reduction of NOx which are not converted through the LNT 285.

Other embodiments may include an exhaust gas recirculation (EGR) duct 300 coupled between the exhaust manifold 225 and the intake manifold 200. The EGR duct 300 may include an EGR cooler 310 to reduce the temperature of the exhaust gases in the EGR duct 300. An EGR valve 320 regulates a flow of exhaust gases in the EGR duct 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445.

Moreover, the sensors include a nitrogen-oxides sensor 291 (NOx sensor), located in the exhaust line 275 and suitable to measure the concentration (and/or the amount dosed over a time interval) of nitrogen oxides between the LNT 285 and the reductant storage device 290 (see FIG. 3).

The NOx sensor 291 may be positioned downstream of the LNT 285, such as at an outlet thereof, and upstream of the reductant storage device 290, such as for example at an inlet thereof. In the example shown in FIG. 3, the LNT 285 and the reductant storage device 290 are close-coupled and the nitrogen oxides sensor 291 is disposed between the LNT 285 and the reductant storage device 290.

According to an embodiment of the present disclosure, the nitrogen-oxides sensor 291 may be a sensor suitable to be cross-sensitive to a reductant species, such as ammonia ($NH_3$), and may be used to detect both the nitrogen-oxides (NOx) concentration (and/or the amount dosed over a time interval) and the ammonia ($NH_3$) concentration (and/or the amount dosed over a time interval), the latter for example when the nitrogen-oxides concentration in the exhaust gas gets smaller than a predetermined threshold value (e.g. zero) or is minimal.

The NOx sensor 291 may be the one NOx sensor disposed in the exhaust gas line 275, but as an alternative an additional nitrogen-oxides sensor 292 (NOx sensor) may be located in the exhaust line 275 in such a way to measure the concentration of nitrogen oxides downstream of the reductant storage device 290 (see FIG. 3). The additional NOx sensor 292 may be positioned downstream of the reductant storage device 290, such as at an outlet thereof.

Furthermore, the ECU 450 may generate output signals to various control devices that are arranged to control the operation of the ICE 110, including, but not limited to, the fuel injector 160, the throttle valve 330, the EGR Valve 320, the VGT actuator 255, and the cam phaser 155. Note, dashed lines are used to indicate communication between the ECU 450 and the various sensors and devices, but some are omitted for clarity.

Turning now to the ECU 450, this apparatus may include a digital central processing unit (CPU 460) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, enabling the CPU to execute such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulated technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this computer-readable storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

One of the tasks of the ECU 450 may be that of determining the amount of ammonia which, during a regeneration event of the LNT 285, is produced by the LNT 285, slips from the LNT 285 to the reductant storage device 290 and is stored in the reductant storage device 290.

Figure 4:
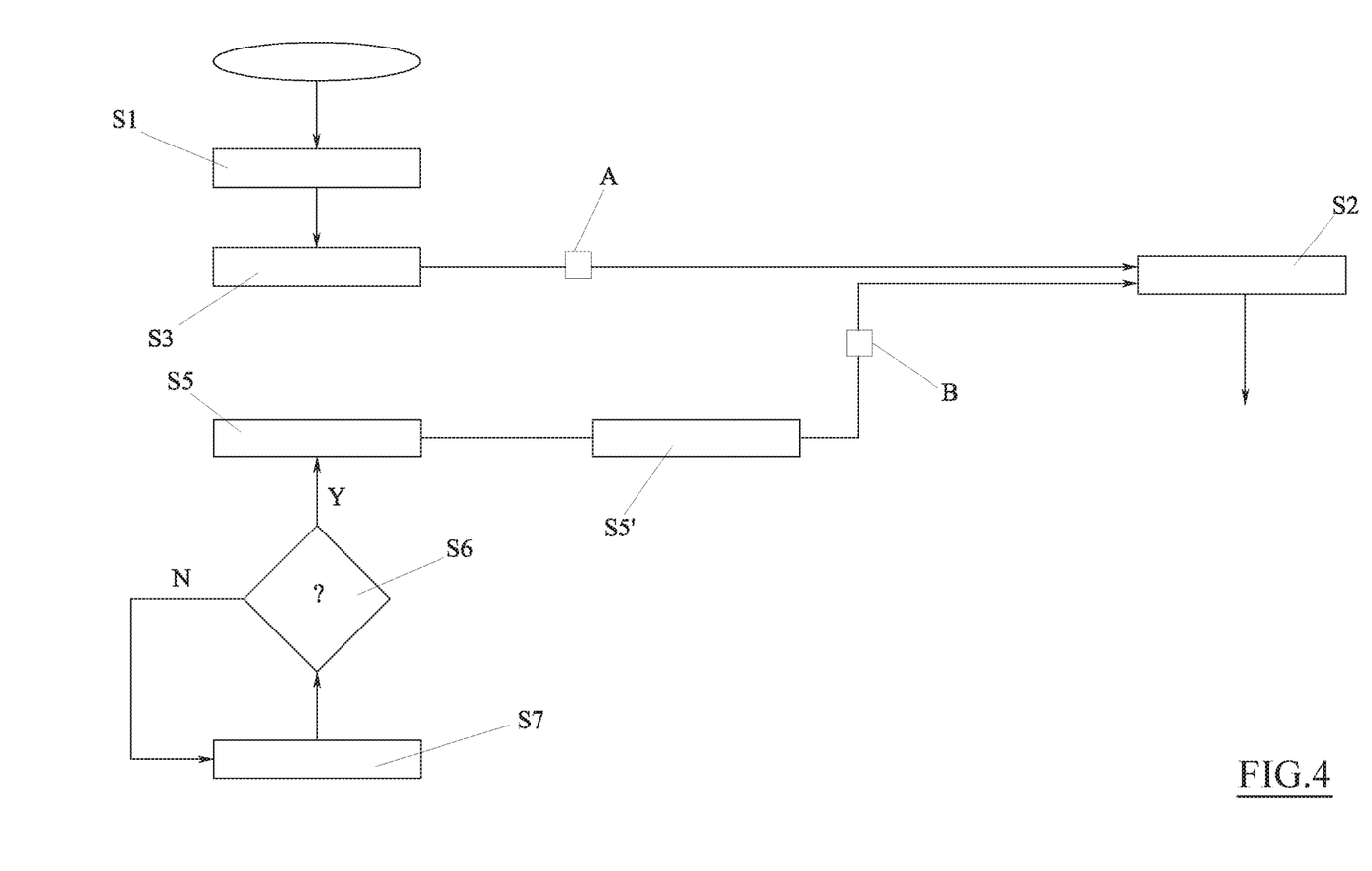
FIG. 4 is a flowchart of a method of determining a reductant amount in the aftertreatment system of FIG. 3, according to an embodiment of the present disclosure.

According to an embodiment of the present disclosure, the ECU 450 may be configured to execute (block S1) a regeneration event of the LNT 285, for example a $DeNO_x$ regeneration event. A regeneration event of the LNT 285 may be performed by switching the ICE 110 from the usual lean combustion mode (lambda value>>1) to a rich combustion mode (e.g. lambda value≤1). The rich combustion mode may be achieved, for example, by actuating the fuel injector 160 to inject fuel into the combustion chambers 150 according to a multi-injection pattern including one or more of fuel after-injections. An after-injection is a fuel injection which is performed by the fuel injector 160 after the Top Dead Center (TDC) of the piston 140 and before the opening of the exhaust ports 220, so that the after-injected fuel quantity actually burns inside the combustion chamber 150 but has not a significant impact on the torque generation.

In particular, during rich combustion mode, for example when lambda value gets smaller than 1, nitrogen oxides stored in the LNT 285 react with Hydrogen atoms contained in the exhaust gas thereby producing, in-situ, ammonia molecules by way of an example according to the following reaction:

$$5H_2 + 2NO \rightarrow 2NH_3 + 2H_2O.$$

The produced ammonia slips into the reductant storage device 290 where it is stored on adsorbent sites thereof.

During the regeneration event, the ECU 450 is configured to determine (block S2) an amount of ammonia produced by the LNT 285. To do so, the ECU 450 may be configured to estimate (block S3) a first quantity A of ammonia produced by the LNT 285 during the regeneration, to calculate (block S4) a second quantity B of ammonia produced by the LNT 285 during the regeneration, and then to precisely correct the estimated first quantity by means of the second quantity as disclosed hereinafter.

In particular, the first quantity A of ammonia may be determined on the basis of one or more of the following parameters: a temperature value of an exhaust gas into the exhaust gas line 275 during the regeneration, a nitrogen-oxides concentration in the exhaust gas line 275 upstream of the LNT 285, a content of nitrogen-oxides stored in the LNT 285 a set point value of a lambda value during the regeneration event and a duration of the regeneration event.

For example, the temperature value may be measured by one of the exhaust pressure and temperature sensors 430, the nitrogen-oxides concentration may be measured by the NOx sensor 291, the content of the nitrogen-oxides may be estimated on the basis of measurements of the nitrogen oxides concentrations in the exhaust gas during the lean-combustion mode upstream of the LNT 285 and downstream of the LNT 285, for example by the NOx sensor 291 and another NOx sensor (not shown) positioned upstream of the LNT 285. To do so, the ECU 450 may be configured to progressively integrate over time the difference between the measured concentrations of the nitrogen oxides upstream and downstream of the LNT 285, thereby calculating and progressively updating the overall amount thereof, and to store the value of the integrated concentration at the end of each lean-combustion mode.

The set point value of the lambda value may be determined as a further value pre-calibrated on a test bench and stored in the memory system. For example, the estimation of the first quantity A of ammonia, shown in detail in FIG. 7, may be provided as output of a pre-calibrated map which receives as input the above said parameters. This map may be predetermined during experimental activities performed on a test bench and stored in the memory system.

By way of another example, the first quantity A of ammonia may be determined by the ECU 450 on the basis of the product of a base quantity 500 of ammonia and a first correction factor F1, wherein the base quantity 500 is determined on the basis of the temperature value of an exhaust gas into the exhaust gas line 275 during the regeneration, the nitrogen-oxides concentration in the exhaust gas line 275 upstream of the LNT 285 and a set point value of a lambda value during the regeneration event, as disclosed in detail hereinafter, and the first correction factor F1 is determined on the basis of the content of nitrogen-oxides stored in the LNT 285, as disclosed in detail below. The first quantity A may also be determined by the ECU 450 as the product of a second correction factor F2 determined on the basis of the duration of the regeneration event with the product of the base quantity 500 and the first correction factor F1.

More in detail, the base quantity 500 may be provided as the product of a first contribution 505 of the ammonia quantity with a third correction factor F3. The first contribution 505 may be provided as output of a pre-calibrated first map M1 which receives as input the temperature value of an exhaust gas into the exhaust gas line 275 during the regeneration and the nitrogen-oxides concentration in the exhaust gas line 275 upstream of the LNT 285. This first map M1 may be predetermined during experimental activities performed on a test bench and stored in the memory system. The third correction factor F3 may be provided as output of a pre-calibrated second map M2 which receives as input the temperature value of an exhaust gas into the exhaust gas line 275 during the regeneration, the nitrogen-oxides concentration in the exhaust gas line 275 upstream of the LNT 285 and the set point value of the lambda value. This second map M2 may be predetermined during experimental activities performed on a test bench and stored in the memory system.

Experimental activities for the determination of the first map M1 may provide for a technician to execute a calibration method on at least one test internal combustion engine, for example an internal combustion engine which is equal to the ICE 110, equipped with a reductant storage device equal to the reductant storage device 290 and a sensor suitable to sense the concentration of ammonia, such as for example an FTIR sensor, positioned downstream of a LNT equal to the LNT 285 and upstream of the reductant storage device. Such calibration method may include:

performing a regeneration event of the LNT switching the internal combustion engine from a lean-combustion mode to a rich-combustion mode for at least 30 seconds and maintaining constant the set point value of the lambda value (and for example the engine operating point);

measuring, with the sensor, the corresponding values of the first contribution of the first quantity of ammonia produced by the LNT for a plurality of temperature values of the exhaust gas and of nitrogen-oxides concentration values in the exhaust gas line upstream of the LNT; and storing the measured first contributions in a first map M1 which correlates each temperature value of the exhaust gas and each value of nitrogen-oxides concentration to one relative measured first contribution.

Knowing the first map M1, by way of an example, experimental activities for the determination of the second map may provide for a technician to execute a further calibration method on the same test internal combustion engine disclosed above. The further calibration method may include:

performing a regeneration event of the LNT switching the internal combustion engine from a lean-combustion mode to a rich-combustion mode for at least 30 seconds;

measuring, with the sensor, the corresponding values of the base quantity of ammonia produced by the LNT for a plurality of temperature values of the exhaust gas, of nitrogen-oxides concentration values in the exhaust gas line upstream of the LNT and of set point values of the lambda value;

calculating each third correction factor F3 for each set point value of the lambda value as the ratio between each measured base quantity and each known first contribution, relative to the same temperature value of the exhaust gas and nitrogen-oxides concentration value in the exhaust gas line upstream of the LNT; and storing the calculated third correction factors F3 in a second map M2 which correlates each temperature value of the exhaust gas, each value of nitrogen-oxides concentration and each set point value of the lambda value to one relative third correction value F3.

Again, the first correction factor F1 may be provided as output of a pre-calibrated third map M3 which receives as input the temperature value of an exhaust gas into the exhaust gas line 275 during the regeneration and the content of nitrogen-oxides stored in the LNT 285. This third map M3 may be predetermined during experimental activities performed on a test bench and stored in the memory system.

By way of an example, knowing the first and the second maps, the experimental activities for the determination of the third map M3 may provide for a technician to execute another calibration method on at least one test LNT equal to the LNT 285 equipped with a sensor suitable to sense the concentration of ammonia, such as for example an FTIR sensor, positioned downstream of the LNT. Such calibration method may include:

performing a regeneration event of the LNT switching the internal combustion engine from a lean-combustion mode to a rich-combustion mode for at least 30 seconds;

measuring, by means of the sensor, for a plurality of temperature values of the exhaust gas and of values of the content of nitrogen-oxides stored in the LNT the corresponding values of the real quantity of ammonia produced by the LNT;

calculating each first correction factor F1 as the ratio between each measured real quantity and each known base quantity 500, relative to the same temperature values of the exhaust gas and of values of the content of nitrogen-oxides stored in the LNT; and storing the measured first correction factors F1 in a third map M3 which correlates each temperature value of the exhaust gas and each value of the content of nitrogen-oxides stored in the LNT to one relative first correction factor F1.

Again, the second correction factor F2 may be provided as output of a pre-calibrated fourth map M4 which receives as input the duration of the regeneration event. This fourth map M4 may be predetermined during experimental activities performed on a test bench and stored in the memory system.

By way of an example, knowing the first, the second and the third maps, the experimental activities for the determination of the fourth map M4 may provide for a technician to execute another calibration method on at least one test LNT equal to the LNT 285 equipped with a sensor suitable to sense the concentration of ammonia, such as for example an FTIR sensor, positioned downstream of the LNT. Such calibration method may include:

performing a regeneration event of the LNT switching the internal combustion engine from a lean-combustion mode to a rich-combustion mode;

measuring, by means of the sensor, for a plurality of durations of the regeneration event the corresponding values of the actual real quantity of ammonia produced by the LNT;

calculating each second correction factor F2 as the ratio between each measured actual real quantity and each known real quantity retrieved by the first, second and third maps (as disclosed above); and storing the second correction factors F2 in a fourth map M4 which correlates each duration of the regeneration event to one relative second correction factor F2.

As mentioned above, the ECU 450 is contemporaneously configured to calculate the second quantity of ammonia produced by the LNT 285 during the regeneration event. This calculation may be made on the basis of an ammonia concentration in the exhaust gas flowing between the LNT 285 and the reductant storage device 290.

According to an embodiment, the ammonia concentration in the exhaust gas may be measured (block S5) by a sensor, for example the NOx sensor 291 thereby taking advantage of its cross-sensitivity to the ammonia. In particular, in order to acquire the signal of the NOx sensor 291 as significant of the ammonia concentration in the exhaust gas, the ECU 450 is configured to verify (block S6) that an enabling condition is fulfilled.

By way of example, the ECU 450 may be configured to estimate (block S7) a value of a nitrogen oxides concentration in an exhaust gas flowing along the exhaust gas line 275 downstream of the LNT 285 during the regeneration event. The estimated value may be provided as output of a pre-calibrated map which receives as input a time elapsed since the beginning of the regeneration event. This map may be predetermined during experimental activities performed on a test bench and stored in the memory system. When the estimated value of the nitrogen oxides concentration gets equal to or smaller than a predetermined threshold value thereof, e.g. zero or a minimum concentration value, the ECU 450 is configured to start the cross-sensitivity measurement (block S5) of the reductant concentration exhaust gas. In practice, the ECU 450 may be configured to acquire the signal of the NOx sensor 291, which for example is different from an expected zero signal, and to assume that signal as a significant measurement of the ammonia concentration in the exhaust gas.

At this point, the ECU 450 may be configured to convert (block S5') the output signal of the NOx sensor 291 significant of the concentration (e.g. expressed in ppm) of the ammonia in the exhaust gas into the second quantity (e.g. expressed in mg), for example by calculating the integral of the reductant concentration since the beginning of the cross-sensitivity measurement.

Knowing these quantities (i.e. the first quantity and the second quantity of ammonia produced by the LNT 285 during the regeneration event), the ECU 450 may be configured to calculate (block S2) the amount of ammonia produced by the nitrogen-oxides trap 285 during the LNT regeneration according the following formula:

$$[NH_3]_{tot}=(1-k)*A+k*B,$$

Wherein:

$[NH_3]_{tot}$ is the amount of ammonia produced by the LNT 285 during the regeneration event, A is the estimated first quantity, B is the calculated second quantity, and k is a percentage correction factor.

The values of the correction factor k may be included between 0 and 1.

The correction factor k may be determined on the basis of one or more parameters chosen among: a temperature value of the exhaust gas during the regeneration, (e.g. measured by the exhaust pressure and temperature sensor 430), a value of an oxygen concentration of the exhaust gas during the regeneration (e.g. measured by a lambda sensor 293 disposed in the exhaust gas line 275, for example upstream of the LNT 285, or by the NOx sensor 291) and an ageing factor of the NOx sensor 291 (e.g. predetermined during experimental activities performed on a test bench and stored in the memory system). The correction factor k may be provided as output of a calibration map determined by an experimental activity executed on a test bench and stored in the memory system 460.

For example, knowing the estimated first quantity A, this experimental activity may provide for a technician to execute a calibration method on at least one test internal combustion engine, for example an internal combustion engine which is equal to the ICE 110, equipped with a reductant storage device equal to the reductant storage device 290 and a sensor suitable to sense the concentration of ammonia, such as for example a FTIR sensor, and a NOx sensor equal to the NOx sensor 291 both positioned downstream of a LNT equal to the LNT 285 and upstream of the reductant storage device. Such calibration method may include:

performing a regeneration event of the LNT switching the internal combustion engine from a lean-combustion mode to a rich-combustion mode for at least 30 seconds;

measuring, by means of the sensor, for a plurality of temperature values of the exhaust gas, of oxygen concentration values of the exhaust gas and of ageing factors, the corresponding values of the total amount of ammonia produced by the LNT;

measuring, by means of the NOx sensor, for a plurality of temperature values of the exhaust gas of oxygen concentration values of the exhaust gas and of ageing factors, the corresponding values of the second quantity of ammonia produced by the LNT;

calculating each correction factor k as the ratio between each measured total amount from which is subtracted the estimated first quantity and each measured second quantity from which is subtracted the estimated first quantity, relative to the same temperature value of the exhaust gas, oxygen concentration value of the exhaust gas and ageing factor; and storing the measured correction factors k in a map which correlates each temperature value of the exhaust gas, oxygen concentration value of the exhaust gas and ageing factor to one relative measured correction factor k.

In practice, each correction factor k is calculated as the value which allows the total amount of ammonia retrieved by the above formula being equal to the total amount of ammonia measured by the FTIR sensor. As a special case, the correction factor k may be equal to 1 and the total amount of ammonia produced by the LNT 285 during the regeneration event may be equal to the measured second quantity. In this special case therefore the total amount of ammonia produced by the LNT (285) during the regeneration event is exclusively performed by means of the cross-sensitivity measurement of the NOx sensor 291.

Figure 5:
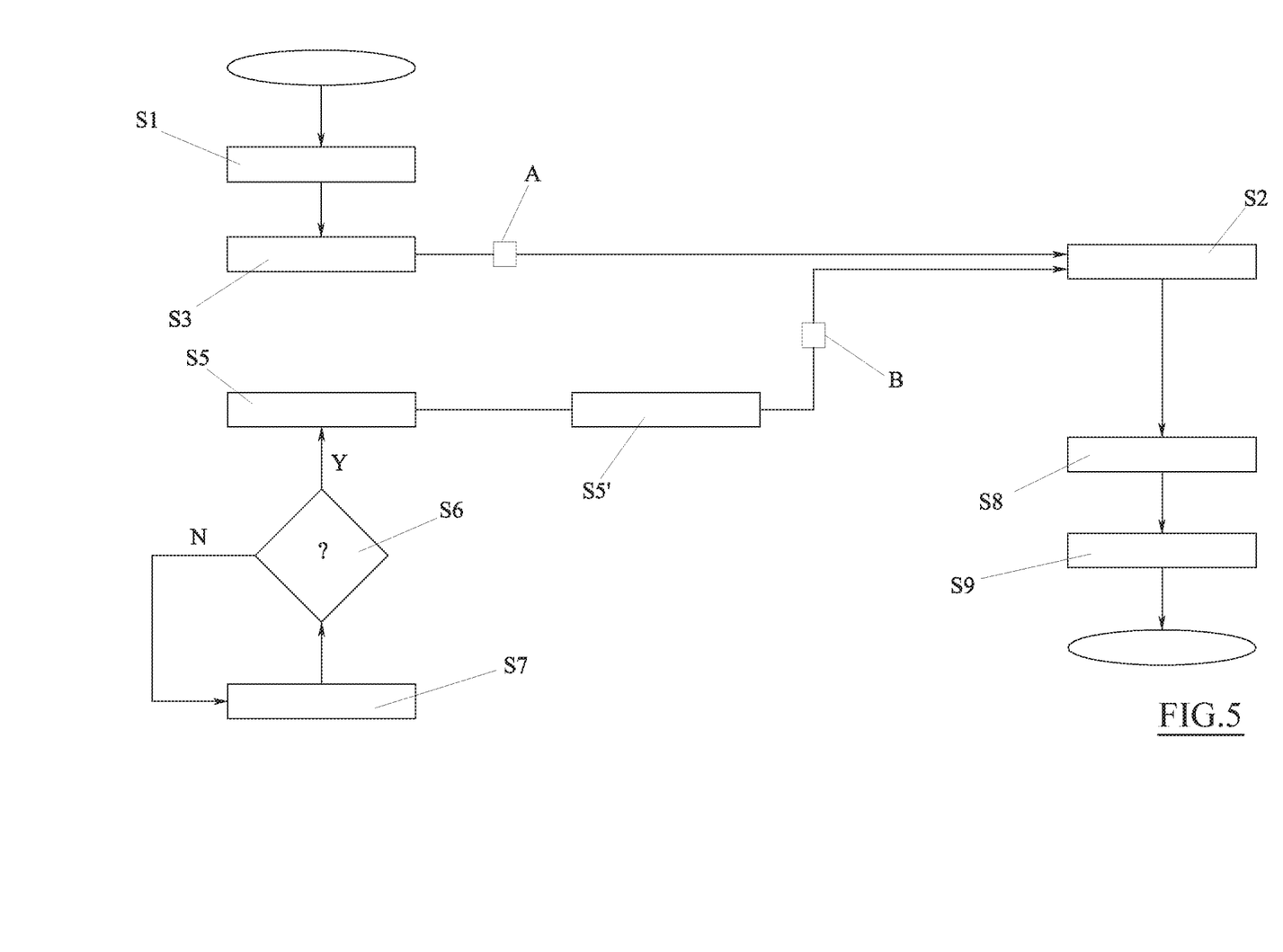
FIG. 5 is a flowchart of a method of determining a reductant amount in the aftertreatment system of FIG. 3, according to a further embodiment of the present disclosure.

According to an embodiment shown in FIG. 5, the determined amount of ammonia produced by the LNT 285 during the regeneration event may be used by the ECU 450 to control the regeneration event of the LNT 285, for example to interrupt the regeneration event. In particular, the regeneration event may be interrupted if the calculated total amount of ammonia produced by the LNT 285 during the regeneration event is equal to or higher than a predetermined threshold value, for example a maximum storage capacity of the reductant storage device 290, predetermined during experimental activities performed on a test bench and stored in the memory system.

In this latter case, the ECU 450 may be configured to compare (block S8) the calculated amount of ammonia produced by the LNT 285 during the regeneration event with the maximum storage capacity of the reductant storage device 290 and to interrupt (block S9) the regeneration event, when the calculated amount of ammonia produced by the LNT 285 during the regeneration event gets equal to or greater than the maximum storage capacity, therefore avoiding that an excess of ammonia will be produced by the LNT 285 and released by the reductant storage device 290 out of the exhaust gas line 275 in the ambient environment.

Figure 6:
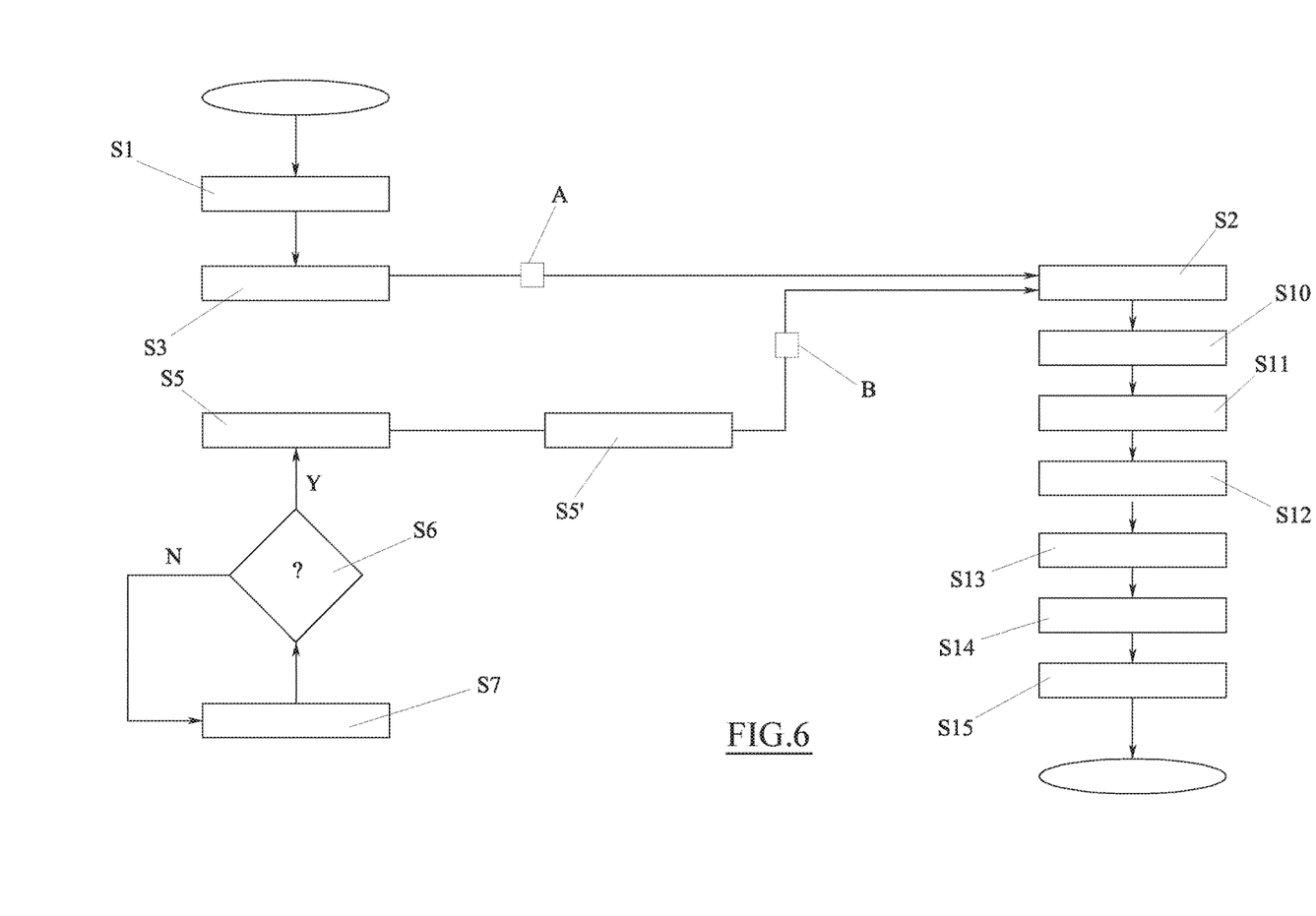
FIG. 6 is a flowchart of a method of determining a reductant amount in the aftertreatment system of FIG. 3, according to another embodiment of the present disclosure.

According to a further embodiment shown in FIG. 6, one of the tasks of the ECU 450 may be that of executing a test strategy aimed to identify whether the reductant storage device 290 is properly functioning as a reductant of nitrogen-oxides. To do so, the ECU 450 may be configured to compare (block S10) the calculated amount of ammonia produced by the LNT 285 during the regeneration event with a further predetermined threshold value thereof, which may be predetermined during experimental activities performed on a test bench and stored in the memory system and may be greater than zero. If the calculated amount of ammonia produced by the LNT 285 during the regeneration event is equal to or greater than said predetermined threshold value, a minimum amount of ammonia is certainly stored in the reductant storage device 290 and, therefore, the ECU 450 may be configured to start said test strategy.

By way of an example, the test strategy may provide for the ECU 450 to be configured to:

determine (block S11) a first value of nitrogen oxides concentration upstream of the reductant storage device 290, for example by means of a direct measurement performed by means of the NOx sensor 291;

determine (block S12) a second value of nitrogen oxides concentration downstream of the reductant storage device 290 for example by means of a measurement performed by means of the further NOx sensor 292;

calculate (block S13) a difference between the first value and the second value, and identify (block S14) a malfunctioning of the reductant storage device 290, if the calculated difference is equal to or smaller than a predetermined threshold value thereof, wherein this predetermined threshold value may be predetermined during experimental activities performed on a test bench and stored in the memory system.

In practice, a malfunctioning of the reductant storage device 290 may be identified if a minimum amount of ammonia is certainly stored in the reductant storage device 290 and no or few NOx reduction is observed in the exhaust gas across the reductant storage device 290.

Once a malfunctioning of reductant storage device 290 has been identified, the ECU 450 may be configured to perform one or more recovery actions. These recovery actions may include, but are not limited to, the generation (block S15) of a signal perceivable by a driver, for example through the activation of a signaler or indicator (e.g. a light and/or a sound) disposed in a dashboard of the automotive system 100. In this way the driver may be informed of the malfunctioning of the reductant storage device 290 and suggested to take some countermeasures, for example to go to the nearest car service center.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating an aftertreatment system of an internal combustion engine having a lean nitrogen-oxides trap and a reductant storage device downstream of the lean nitrogen-oxides trap, the method comprising:

performing a regeneration of the lean nitrogen-oxides trap;

measuring a reductant concentration in an exhaust gas between the lean nitrogen-oxides trap and the reductant storage device during the regeneration; and calculating an amount of reductant produced by the lean nitrogen-oxides trap on the basis of the measured reductant concentration, wherein the step of calculating the amount of reductant produced by the lean nitrogen-oxides trap comprises:

estimating a first quantity of the reductant on the basis of one or more parameters selected from the group consisting of a temperature value of an exhaust gas during the regeneration, a value of a nitrogen-oxide concentration upstream of the lean nitrogen-oxides trap, a value of a nitrogen-oxide content stored in the lean nitrogen-oxides trap, and a set point value of an air/fuel ratio during the regeneration; and calculating the amount of reductant produced by the lean nitrogen-oxides trap as a function of the estimated first quantity and a second amount of reductant calculated as a function of the measured reductant concentration, wherein the amount of reductant produced by the lean nitrogen-oxides trap is calculated with the following formula:

$$[NH_3]_{tot}=(1-k)*A+k*B,$$

wherein:
[$NH_3$]$_{tot}$ is the amount of reductant produced by the lean nitrogen-oxides trap,
A is the estimated first quantity,
B is the calculated second amount, and
k is a correction factor.

2. The method according to claim 1, further comprising measuring the reductant concentration with a NOx sensor having a cross sensitivity for the reductant.

3. The method according to claim 1, further comprising measuring the reductant concentration when a predetermined enabling condition is fulfilled.

4. The method according to claim 3, further comprising:
estimating a nitrogen oxides concentration in the exhaust gas downstream of the lean nitrogen-oxides trap during the regeneration;
identifying that the enabling condition is fulfilled, when the estimated nitrogen oxides concentration is less than a predetermined threshold value.

5. The method according to claim 1, further comprising determining the correction factor k on the basis of one or more parameters selected from the group consisting of a temperature value of the exhaust gas during the regeneration, a value of an oxygen concentration of the exhaust gas during the regeneration and an ageing factor of a sensor sensing a concentration of the reductant downstream of the lean nitrogen-oxides trap and upstream of the reductant storage device.

6. The method according to claim 1, further comprising interrupting the regeneration when the calculated amount of reductant produced by the lean nitrogen-oxides trap gets equal to or greater than a maximum storage capacity.

7. The method according to claim 1, further comprising testing the proper functioning of the reductant storage device when the calculated amount of reductant produced by the lean nitrogen-oxides trap is equal to or greater than a predetermined threshold value thereof.

8. The method according to claim 7, wherein testing the proper functioning of the reductant storage device comprises:
determining a first value of nitrogen oxides concentration upstream of the reductant storage device;
determining a second value of nitrogen oxides concentration downstream of the reductant storage device;
calculating a difference between the first value and the second value; and
identifying a malfunctioning of the reductant storage device when the calculated difference is equal to or smaller than a predetermined threshold value thereof.

9. A non-transitory computer readable medium storing a computer program for determining a reductant amount in an aftertreatment system of an internal combustion engine having a lean nitrogen-oxides trap and a reductant storage device downstream of the lean nitrogen-oxides trap, the computer program comprising a program code, when run on a computer, for performing the method according to claim 1.

10. An aftertreatment system comprising:
a lean nitrogen oxides trap;
a reductant storage device downstream of the lean nitrogen-oxides trap;
a sensor configured to sense a concentration of the reductant downstream of the lean nitrogen-oxides trap and upstream of the reductant storage device; and
an electronic control unit configured to:
performing a regeneration of the lean nitrogen-oxides trap;
measuring a reductant concentration in an exhaust gas between the lean nitrogen-oxides trap and the reductant storage device during the regeneration; and
calculating an amount of reductant produced by the lean nitrogen-oxides trap on the basis of the measured reductant concentration, wherein the calculating the amount of reductant produced by the lean nitrogen-oxides trap comprises:
estimating a first quantity of the reductant on the basis of one or more parameters selected from the group consisting of a temperature value of an exhaust gas during the regeneration, a value of a nitrogen-oxide concentration upstream of the lean nitrogen-oxides trap, a value of a nitrogen-oxide content stored in the lean nitrogen-oxides trap, and a set point value of an air/fuel ratio during the regeneration; and
calculating the amount of reductant produced by the lean nitrogen-oxides trap as a function of the estimated first quantity and a second amount of reductant calculated as a function of the measured reductant concentration,
wherein the amount of reductant produced by the lean nitrogen-oxides trap is calculated with the following formula:

$$[NH_3]_{tot}=(1-k)*A+k*B,$$

wherein:
[$NH_3$]$_{tot}$ is the amount of reductant produced by the lean nitrogen-oxides trap,
A is the estimated first quantity,
B is the calculated second amount, and
k is a correction factor.

11. The aftertreatment system according to claim 10, wherein the electronic control unit is configured to interrupt the regeneration when the calculated amount of reductant produced by the lean nitrogen-oxides trap gets equal to or greater than a maximum storage capacity.

12. The aftertreatment system according to claim 10, wherein the electronic control unit is configured to test the proper functioning of the reductant storage device when the calculated amount of reductant produced by the lean nitrogen-oxides trap is equal to or greater than a predetermined threshold value thereof.

13. The aftertreatment system according to claim 10, wherein the sensor comprises a nitrogen oxides sensor having a cross sensitivity to the reductant.

14. The aftertreatment system according to claim 10, wherein the reductant storage device comprises a passive reductant storage device using reductants generated by the lean nitrogen-oxides trap during regeneration thereof for reducing nitrogen-oxides exhausted from the lean nitrogen-oxides trap.

15. An internal combustion engine equipped with an aftertreatment system according to claim 10.

* * * * *